Nov. 11, 1952     G. C. SZIKLAI     2,617,879
SIGNAL QUANTIZER

Filed June 18, 1948     3 Sheets-Sheet 1

INVENTOR
George C. Sziklai
BY
*[signature]*
ATTORNEY

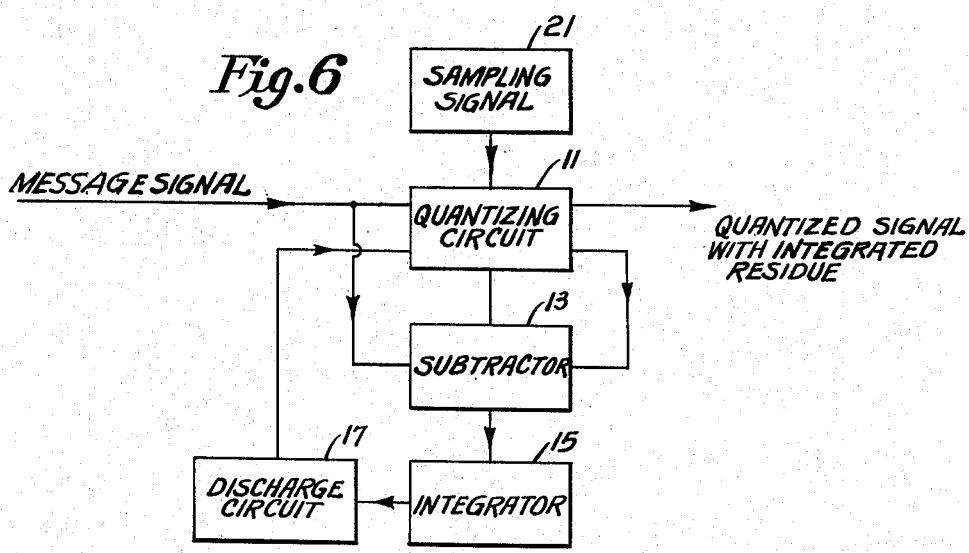
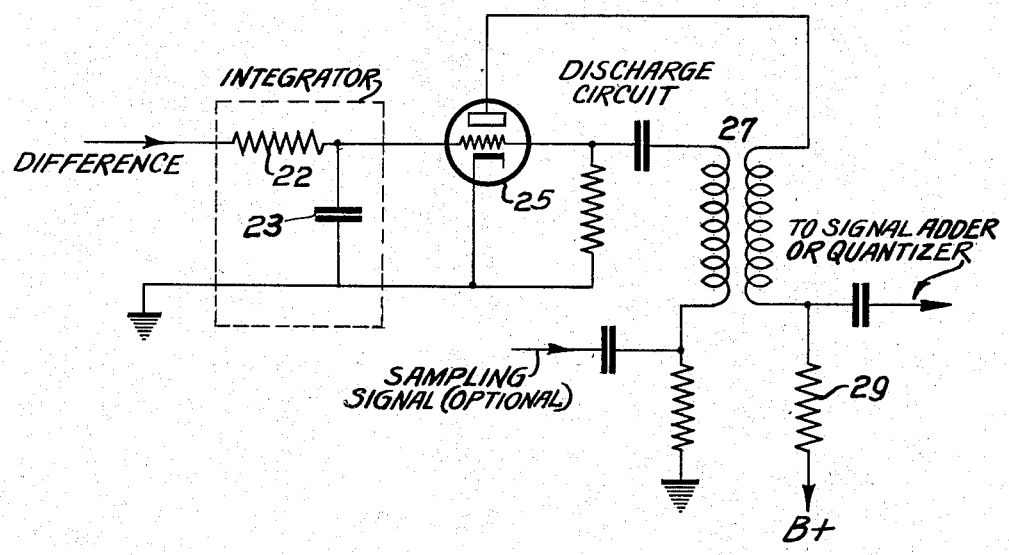

Nov. 11, 1952 G. C. SZIKLAI 2,617,879
SIGNAL QUANTIZER
Filed June 18, 1948 3 Sheets-Sheet 3
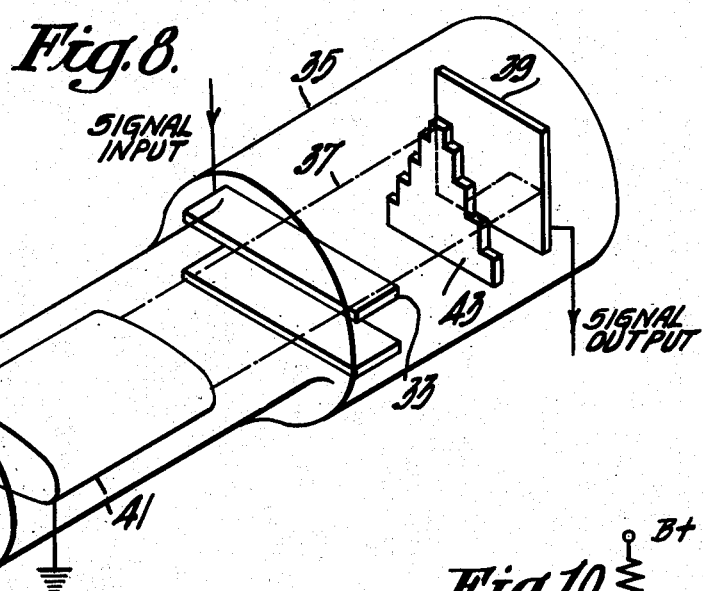
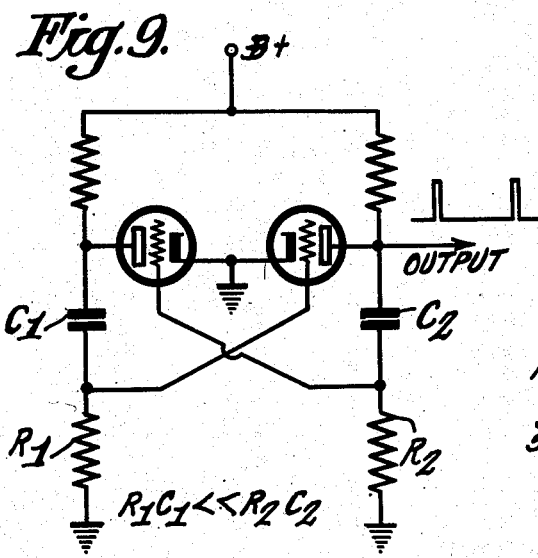
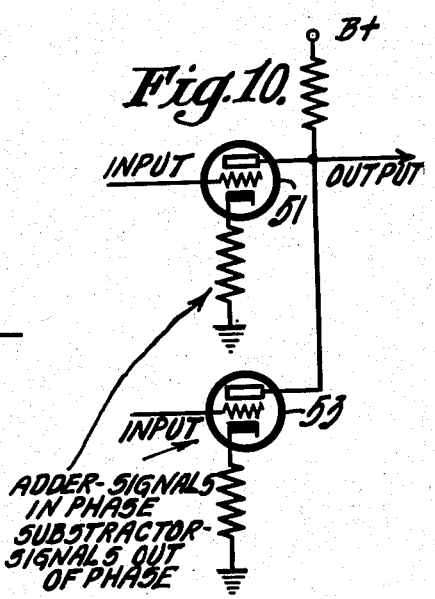
INVENTOR
George C. Sziklai
BY
Olin A. Mitchell
ATTORNEY Patented Nov. 11, 1952

2,617,879

UNITED STATES PATENT OFFICE 2,617,879

SIGNAL QUANTIZER

George C. Sziklai, Princeton, N. J., assignor to Radio Corporation of America, a corporation of Delaware Application June 18, 1948, Serial No. 33,729

13 Claims. (Cl. 178—43.5)

This invention relates to electrical intelligence signal transmission methods and arrangements, and more particularly to improvements in signal quantizing.

The term "quantizing" is a designation which has been given to intelligence transmission of electrical circuits wherein the intelligence signal is divided into a predetermined number of amplitudes and the signal is transmitted at only these predetermined amplitude levels.

The presently published art includes further definition and explanation of the operation of such arrangements. A typical quantizing arrangement may be found in the copending U. S. application of George A. Morton, Serial No. 6,455, filed February 5, 1948.

It will be seen from an examination of the heretofore proposed arrangements for the transmission of signal intelligence by quantizing that the limitation in number of steps of amplitude does restrict the amplitude accuracy of transmission of the intelligence information.

It has been found, however, that in view of the saving band width in the transmission channel, a certain amount of inaccuracy in amplitude transmission may be tolerated.

It is fundamental, however, that the fewer amplitude steps employed in the quantizing arrangement, the less requirement for band width and power. The desirability of the minimum number of quantum levels may be best appreciated if it is considered that noise interference, multipath, and other spurious signals can provide an ambiguity in the quantizing by shifting the signal from the definite quantum levels, either to intermediate values or to entirely different quantum levels.

In the case of multiplexing quantizing transmission methods, as described in the copending U. S. application of George C. Sziklai and Alda V. Bedford, Serial No. 113,256, filed August 31 1949, the ambiguity of the quantized signal can cause serious cross-talk between the multiplexed channels. It is obvious from this respect that the quantum level should be large in comparison to undesired signals as described above, and that can be maintained only by either high power or a minimum number of quantum levels.

The inaccuracies in signal transmission increase, however, as the number of amplitude steps is reduced. It is therefore necessary to select a compromise or to select the minimum tolerable amplitude error.

According to this invention, there is provided a method and arrangement for more accurately transmitting amplitude in a quantizing system without an increase in transmission band width or power requirements, or a reduction in band width and/or power requirements may be had by the practice of this invention while transmitting amplitude accuracy equivalent to the usual quantizing arrangements.

According to this invention, the difference between the message or intelligence signal and the quantizing signal thereof is integrated and added back into the signal transmission circuit. In this manner a more accurate transmission of signal amplitude characteristics results.

A primary object of this invention is to provide an improved signal transmission circuit.

Another object of this invention is to provide a more efficient signal transmission circuit.

Another object of this invention is to provide a more accurate quantizing circuit arrangement.

Still another object of this invention is to provide for increased signal information transmission over a smaller transmission band.

Other and incidental objects of the invention will be apparent to those skilled in the art from a reading of the following specification and an inspection of the accompanying drawing in which.

Figure 4:
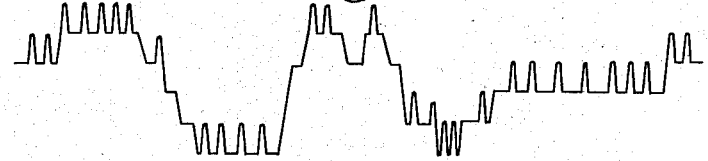
Figure 5:
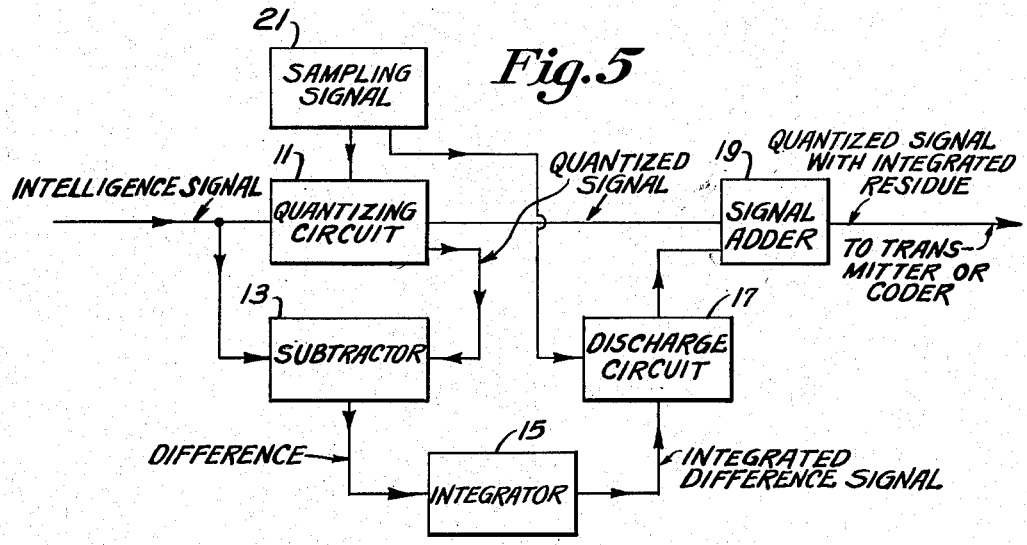

Figure 4 indicates the signal resulting from the combination of the integrated difference signal and the quantized signal;

Figure 5 illustrates by block diagram one form of this invention;

Figure 6 also illustrates by block diagram another form of this invention;

Figure 7 illustrates circuit details of a signal integrator and a discharge circuit suitable for employment in the practice of this invention;

Figure 8 shows quantizing arrangement suitable for operation in the present invention;

Figure 9 shows by circuit diagram one form of circuit suitable for obtaining sampling signal; and Figure 10 shows by circuit diagram a signal adder or a signal subtracter suitable for employment in the practice of this invention.

Figure 1:
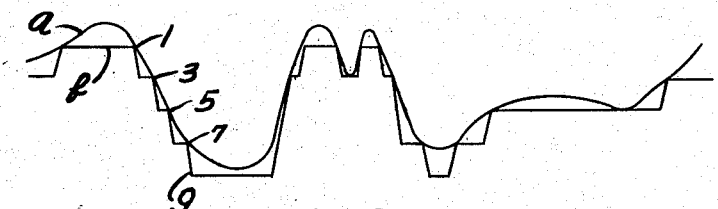
Figure 1 shows graphically the principle of signal quantizing.

Turning now in more detail to Figure 1, there is illustrated by a smooth curve "a" an arbitrary signal amplitude which is the subject of analysis in the explanation of the operation of this invention. Curve "b" results when a signal having an amplitude such as is illustrated in curve "a" is quantized.

In the explanation of the operation of this invention, we are not particularly concerned with specific methods and arrangements for quantizing. Certain arrangements are known in the art. The copending Morton U. S. application referred to above is an example. The copending U. S. application of Sziklai and Bedford, also referred to above, describes the use of quantized signals for the television transmission of images in substantially their natural color and having a transmission band width requirement comparable to that of a monochromatic television signal band width requirement.

In all quantizing systems and methods, the level of fidelity of transmission is generally proportional to the number of quantizing levels or the number of amplitude steps.

Figure 2:
Figure 2 illustrates graphically the difference between the original intelligence signal and the quantized signal.

It will be seen that curve "b" is limited in its amplitude to a certain number of predetermined steps. In the case shown, there are steps 1, 3, 5, 7 and 9. The five steps of amplitude of curve "b" represent the infinite number of steps of curve "a." Upon examination of the curve "b," however, it is noticed that many discrepancies exist and accurate amplitude transmission is not possible. This inaccuracy is more apparent when the curve of Figure 2 is examined. The curve of Figure 2 illustrates the difference between the original intelligence signal illustrated by curve "a" and the quantized signal illustrated by curve "b" of Figure 1.

It will be seen, upon inspection of the curve shown in Figure 2, that the fidelity of the quantized signal represented by curve "b" of Figure 1 is better when a rapid change in original signal amplitude is taking place. However, it shows greater differences when the original signal amplitude represented by curve "a" of Figure 1 is comparatively constant.

It has been observed on quantized television images that large areas of equal quantum appear to be rather unpleasant, and this effect has been termed the "puddling" effect of quantizing.

Circuit arrangements for subtracting one signal from the other, such as, for example, subtracting the quantized signal from the intelligence signal, are well known in the art. A method and circuit arrangement for such subtraction has been shown and described in the copending U. S. application of Sziklai et al. referred to above.

The difference between the intelligence signal and its quantized signal always amounts to an amplitude which is less than one quantized level, or, in other words, less than the difference between the predetermined amplitude steps of the quantized signal. It will be seen, however, that if several subsequent residues can be made to build up to a total amplitude that is equal to a quantized level, a signal train of pulses such as that illustrated by the curve in Figure 3 may be produced. Although a single quantum amplitude is illustrated, the pulses may be of more than one quantum level amplitude. It may be converted in this accumulated form into a pulse corresponding to the highest frequency in the image of one quantum amplitude level and added to the quantized signal, thus providing some breaking up of the long uniform portions in the quantized signal. Such a signal, which consists of the quantized signal and the integrated residue or differences superimposed on the quantized signal with one quanta level, is illustrated in Figure 4.

The average value of the signal illustrated in Figure 4 approximates the original signal represented by curve "a" of Figure 1. It will therefore be seen that without increasing the number of quantum levels and therefore the band width requirements, a closer approximation to accurate amplitude transmission is possible by the employment of this invention.

Since the integrated pulses are extremely fine at a normal viewing distance, they will not be seen, but will give the overall effect of a smooth transition very similar to that of the original signal before quantizing; however, on closer observation even very fine details can be observed, since the quantized residue pulses do not destroy the high frequency reproduction of the image. One example of this may be when a fine print is televised which is, of course, by nature quantized, in which case approach to the television screen even to a small extent will provide the full detail to the observer.

Turning now to Figure 5, there is shown by block diagram one method and arrangement of providing a quantized signal with an integrated difference or residue signal. The intelligence signal is applied to a quantizing circuit arrangement 11 which is shown by block, but which may be of any type, such as that illustrated in the published art or in the copending applications referred to above. Such a quantizing apparatus is described in the Bell System Technical Journal of July 1948. The quantized signal is subtracted from the original intelligence signal in subtracter 13 and applied to an integrator 15. The signal from the integrator 15 is applied to the discharge circuit 17. The integrator 15 and the discharge circuit 17 are shown in detail in Figure 7 and their operation will be described in detail below.

Figure 3:
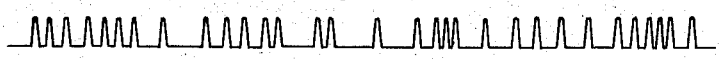
Figure 3 shows graphically an integration of the difference signal established in equal amplitude pulse energy at definite time intervals.

The function of the integrator 15 and discharge circuit 17 is to produce a series of pulses as illustrated in Figure 3 above. The series of pulses obtained from the discharge circuit 17 is then combined in signal adder 19 with the quantized signal.

A sampling arrangement is included and functions in a manner familiar in the art. The sampling signal 21 is applied to quantizing circuit 11 and to the discharge circuit 17 to make those circuits operative to sample the signal energy passed through them; that is, the quantizing circuit 11 and the discharge circuit 17 are operative periodically for small intervals of time. The sampling signal may, for example, be provided by a multivibrator circuit which is well known to the electrical art.

In the form of the invention illustrated in Figure 5, the integrated difference signal is added to the quantized signal.

It is also possible to add the integrated signal to the original intelligence signal before quantizing. Such an arrangement is shown in block in Figure 6, wherein like numerals designate similar elements.

In Figure 6, the intelligence signal is applied to quantizing circuit 11. The subtracter 13 obtains the difference between the quantized and the original intelligence signal and passes this difference to the integrator 15, which energizes the discharge circuit 17. The output signal of the discharge circuit, which is the integrated difference signal converted to a series of equal amplitude pulses, is applied to the input of the quantizing circuit 11. The output signal of quantizing circuit 11 will then be a quantized intelligence and integrated difference signal.

Sampling signal 21 is also employed in the form of the invention shown in Figure 6 and it may also be applied to set off the discharge circuit 17 at the predetermined sampling rate.

Turning now to Figure 7, there is shown an integrator circuit including resistance 22 and condenser 23. The integrated circuit is applied to the control electrode of tube 25. The output and input circuits of tube 25 are coupled through transformer 27.

Upon close examination of the circuit arrangement of Figure 7, it will be seen that the tube 25 operates in the nature of a blocking oscillator. The signal energy stored in condenser 23 is built up with the difference signal, and when the voltage across the condenser 23 is sufficiently high, initiates the operation of the blocking oscillator including tube 25 and transformer 27. A signal pulse will be formed in the output circuit.

In place of the blocking oscillator, other types of discharge circuits such as multivibrators, gas discharge circuits or even biased diodes may be employed.

In the circuit illustrated in Figure 7, there is also provision made for the application of a sampling signal to the control electrode of tube 25. This will cause the oscillator to be operable only at the time of the sampling signal. The discharge circuit has a resistance 29, across which a pulse of one quantum level may be obtained or which develops a pulse of such an amplitude level that it may be quantized subsequently, as illustrated in the form of the invention shown in Figure 6.

It will be seen from an examination of the forms of the invention shown in the drawing and described above that an improved quantized signal may be provided without increasing band width.

Figure 8 illustrates one form of quantizing arrangement which is suitable for employment in the present invention. It is not intended that this invention should be limited to such a type of quantizing arrangement, but other circuit devices may be employed.

The incoming intelligence signal which may, for example, be obtained from a television system, is applied to a beam deflection plate 33 of cathode ray tube 35. The cathode ray tube 35 differs in one very important respect from the popular cathode ray tubes. This difference is in the shape of the electron beam 37. It will be seen from the drawing that beam 37 takes the form of a ribbon extending the width of the target 39 by having an extremely small depth or thickness. Such a beam may be formed in the shape of a ribbon as illustrated, or in the shape of a fan. The gun structure 41 is designed to properly shape the beam. The detail of the gun 41 is not believed necessary in view of the many published papers on electron guns.

The application of the input signal to the deflecting plate 33 will vary the position of intersection of the beam 37 on the target 39. It will be seen that the masking element 43 shades the beam 37 from the target 39 to produce a step-like signal from target 39. For purposes of example, the mask 43 is arranged to produce only five separate amplitudes in response to input signals regardless of the intermediate variations in amplitude of the input signal. It will thus be seen that the signal is divided into five amplitudes. More or less steps may, of course, be employed. A further discussion of such a quantizing arrangement will be found in a copending application to George A. Morton referred to above.

Turning now in detail to Figure 9, a multivibrator circuit which is believed to be familiar to the art is illustrated by way of example. It is important, however, in order to obtain the sampling pulses shown at the output circuit of the multivibrator, that the product of the resistance $R_1$ and the capacity $C_1$ be much less than the product of the resistance $R_2$ and the capacity $C_2$. It will be noticed that the positive going pulses are much shorter than the negative pulses. Such pulses may be employed for keying the cathode ray beam of tube 35 of Figure 8 or it may be employed to key into operation for extremely short intervals of time the output amplifier of the tube 35. Here again other keying devices may be employed without departing from the spirit of the invention.

Turning now to Figure 10 there is shown a well known basic type of signal adder or signal subtracter which involves tubes 51 and 53 whose anodes are tied together to obtain an output signal and the signals are impressed on their control electrodes. If the signals are applied in phase, in so far as polarity is concerned, there will be an addition. If, however, they are applied out of phase, there will be a subtraction.

Having thus described the invention, what is claimed is:

1. An intelligence signal transmission circuit of the type employing signal quantizing comprising in combination a quantizer to which the intelligence signal is applied, means for deriving a difference signal which is the difference between the amplitude of the intelligence signal and the quantized signal, an integrator to which said difference signal is applied, and means for adding said integrated difference signal to the signal in said electrical signal transmission circuit.

2. In an electrical intelligence signal transmission circuit of the type employing signal quantizing, the method of improving electrical response accuracy comprising the steps of quantizing the intelligence signal, deriving a difference signal which is the difference between the amplitude of said intelligence signal and the quantized signal, integrating said difference signal, developing from said integrated signal a series of pulses, and adding said pulses to the signal in said electrical signal transmission circuit.

3. In an electrical intelligence signal transmission circuit, the combination of a signal sampler and a signal quantizer connected to quantize samples of said intelligence signal, means for deriving a difference signal, said difference signal being the difference between the amplitude of said intelligence signal and the quantized signal, an electrical signal integrating circuit connected to said means for deriving a difference signal to receive said difference signal, and an electrical mixer to combine said integrated difference signal and the signal in said transmission circuit.

4. In an electrical intelligence signal transmission circuit, the combination of a signal sampler and a signal quantizer connected to quantize samples of said intelligence signal, means for deriving a difference signal, said difference signal being the difference between the ampliture of said intelligence signal and the quantized signal, an electrical signal integrating circuit connected to said means for deriving a difference signal to receive said difference signal, a discharge circuit connected to form pulses of quantum levels from said integrated difference signal, and an electrical mixer to combine said integrated difference signal in pulse form and the signal in said transmission circuit.

5. In an electrical intelligence signal transmission circuit, the combination of a signal sampler and a signal quantizer connected to quantize samples of said intelligence signal, means for deriving a difference signal, said difference signal being the difference between the amplitude of said intelligence signal and the quantized signal, an electrical signal integrating circuit connected to said means for deriving a difference signal to receive said difference signal, a discharge circuit to convert the integrated difference signal into a series of pulses, and an electrical mixer connected to add said integrated difference signal to the signal in said signal transmission circuit.

6. In an electrical intelligence signal transmission circuit, the combination of a signal sampler and a signal quantizer connected to quantize samples of said intelligence signal, means for deriving a difference signal, said difference signal being the difference between the amplitude of said intelligence signal and the quantized signal, an electrical signal integrating circuit connected to said means for deriving a difference signal to receive said difference signal, means for converting the integrated difference signal into a series of equal amplitude pulses, and an electrical mixer connected to add said integrated difference signal to said quantized signal.

7. In an electrical intelligence signal transmission circuit, the combination of a signal sampler and a signal quantizer connected to quantize samples of said intelligence signal, means for deriving a difference signal, said difference signal being the difference between the amplitude of said intelligence signal and the quantized signal, an electrical signal integrating circuit connected to said means for deriving a difference signal to receive said difference signal, means for converting the integrated difference signal into a train of equal amplitude pulses recurring only during predetermined time intervals, and an electrical mixer connected to add said integrated difference signal to said intelligence signal.

8. In an electrical intelligence signal transmission circuit of the type employing signal quantizing, the method of improving electrical response accuracy comprising the steps of quantizing the intelligence signal, deriving a difference signal which is the difference between the amplitude of said intelligence signal and the quantized signal, integrating said difference signal, developing from said integrated signal a series of pulses whose amplitude range is equal to the difference between said quantized amplitude levels, and adding said pulses to the signal in said electrical signal transmission circuit.

9. In an electrical intelligence signal transmission circuit, the combination of a signal sampler and a signal quantizer connected to quantize samples of said intelligence signal, means for deriving a difference signal, said difference signal being the difference between the amplitude of said intelligence signal and the quantized signal, an electrical signal integrating circuit connected to said means for deriving a difference signal to receive said difference signal and to produce therefrom an integrated signal, developing from said integrated signal a series of pulses whose amplitude range is equal to the difference between said quantized amplitude levels and whose repetition rate is governed by the sampling rate, and adding said pulses to the signal in said electrical signal transmission circuit.

10. A circuit for transmitting intelligence in quantized form comprising in combination a quantizer adapted to receive the intelligence bearing signal at its input, a subtracter for extracting the difference between the signal at the input and the output of the quantizer, an integrator coupled to receive the output of said subtracter, and a discharge circuit adapted to produce a pulse having an amplitude equal to an integral number of quantized levels when the output of the integrator reaches a predetermined amplitude.

11. A circuit described in claim 10 wherein an adder is connected to receive the output of said quantizer and the output of said discharge circuit.

12. A circuit as described in claim 10 wherein the output of said discharge circuit is connected to the input of said quantizer.

13. A circuit as described in claim 10 wherein said quantizer is adapted to produce signals in its output circuit in response to sampling signals, and said discharge circuit is adapted to produce a pulse only when said sampling signals are present and when the output of said integrator reaches a predetermined amplitude.

GEORGE C. SZIKLAI.

REFERENCES CITED

The following references are of record in the file of this patent:

UNITED STATES PATENTS

| Number | Name | Date |
|---|---|---|
| 2,261,335 | Braden | Nov. 4, 1941 |
| 2,297,499 | Rappold | Sept. 29, 1942 |
| 2,306,435 | Graham | Dec. 29, 1942 |
| 2,375,966 | Valensi | May 15, 1945 |
| 2,378,547 | Graham | June 19, 1945 |
| 2,434,561 | Hardy | Jan. 13, 1948 |
| 2,435,840 | Morton | Feb. 10, 1948 |
| 2,436,677 | Snyder | Feb. 18, 1948 |
| 2,441,296 | Snyder | May 11, 1948 |
| 2,445,215 | Flory | July 13, 1948 |
| 2,446,945 | Morton | Aug. 10, 1948 |

FOREIGN PATENTS

| Number | Country | Date |
|---|---|---|
| 505,653 | Great Britain | May 11, 1939 |

OTHER REFERENCES

Bell System Technical Journal, January 1948, pages 1 to 48.